United States Patent [19]

Halverson et al.

[11] Patent Number: 4,718,941

[45] Date of Patent: Jan. 12, 1988

[54] INFILTRATION PROCESSING OF BORON CARBIDE-, BORON-, AND BORIDE-REACTIVE METAL CERMETS

[75] Inventors: Danny C. Halverson, Manteca; Richard L. Landingham, Livermore, both of Calif.

[73] Assignee: The Regents of the University of California, Berkeley, Calif.

[21] Appl. No.: 875,419

[22] Filed: Jun. 17, 1986

[51] Int. Cl.$^4$ .............................................. C22C 29/02
[52] U.S. Cl. ...................... 75/236; 75/244; 419/2; 419/12; 419/17; 419/30; 419/34; 419/63
[58] Field of Search .................. 419/2, 12, 17, 30, 34, 419/63; 75/236, 244

[56] References Cited

U.S. PATENT DOCUMENTS

| | | | |
|---|---|---|---|
| 3,953,177 | 4/1976 | Sedlatschek et al. | 428/539.5 |
| 4,585,618 | 4/1986 | Fresnel et al. | 419/12 |
| 4,617,053 | 10/1986 | Joó et al. | 419/12 |

*Primary Examiner*—Stephen J. Lechert, Jr.
*Attorney, Agent, or Firm*—Roger G. Ditzel; Henry P. Sartorio; Valentin Fikovsky

[57] ABSTRACT

A chemical pretreatment method is used to produce boron carbide-, boron-, and boride-reactive metal composites by an infiltration process. The boron carbide or other starting constituents, in powder form, are immersed in various alcohols, or other chemical agents, to change the surface chemistry of the starting constituents. The chemically treated starting constituents are consolidated into a porous ceramic precursor which is then infiltrated by molten aluminum or other metal by heating to wetting conditions. Chemical treatment of the starting constituents allows infiltration to full density. The infiltrated precursor is further heat treated to produce a tailorable microstructure. The process at low cost produces composites with improved characteristics, including increased toughness, strength.

24 Claims, 8 Drawing Figures

27 VOL % PORES

39 VOL % PORES

INFILTRATION PROCESSING OF BORON CARBIDE-, BORON-, AND BORIDE-REACTIVE METAL CERMETS

BACKGROUND OF THE INVENTION

The United States Government has rights in this invention pursuant to Contract No. W-7405-ENG-48 between the U. S. Department of Energy and the University of California for the operation of Lawrence Livermore National Laboratory.

The present invention relates to processes for making metal-ceramic composites, and more particularly to infiltration methods.

U. S. patent application, Ser. No. 730,528, filed May 6, 1985, now U.S. Pat. No. 4,605,440 is directed to boron carbide-reactive metal composites, particularly $B_4C$-AL, and methods for making same. Fully dense composites with tailorable microstructures can be produced. However, it is desirable to find alternate methods for producing these composites.

It is also desirable to form composites of reactive metals and boron or borides.

The concept of infiltrating a molten metal into a ceramic sponge is known and has been carried out by various different methods. U. S. Pat. No. 3,864,154 by Gazza et al shows a method of infiltrating metal into a porous ceramic compact without any treatment of the compact. A compact of silicon boride, aluminum boride or boron is positioned between powdered aluminum in a vacuum furnace. Full density is not achieved. To infiltrate Al into $B_4C$, Si must be added to the Al as a wetting agent; Al alone could not be infiltrated into $B_4C$. U. S. Pat. No. 3,725,015 by Weaver shows an infiltration method in which a precursor is formed with a carbon containing substance and the precursor is heated to decompose the carbon containing substance to form a carbon residue. U. S. Pat. No. 3,718,441 by Landingham shows an infiltration method in which the metal is treated by heating at low pressure to remove an oxide film and facilitate wetting. Other related art includes U. S. Pat. No. 2,612,443, Goetzel et al, which shows an infiltration method in which a skeleton body is formed in a mold by heat treating/sintering and molten metal is forced into the pores by fluid pressure; U. S. Pat. No. 2,581,252, Goetzel et al, and U. S. Pat. No. 2,581,253, Ellis et al, which are directed to infiltrating a skeleton in a mold by applying pressure to the infiltrant; and U. S. Pat. No. 2,672,426, Grubel, which shows a method of making and sintering a metal compact and impregnating with a molten ceramic. None of these patents show the infiltration of aluminum into a porous boron carbide ($B_4C$) sponge; Gazza shows that silicon must be added. Previous attempts to infiltrate aluminum into a $B_4C$ sponge were unsuccessful since these methods were not based on the chemical reaction kinetics and the mechanisms of liquid rearrangement which are the basis of the present invention. Recently Pyzik and Aksay have shown that, by thermal modification of the as-received $B_4C$ starting constituent, it is possible to infiltrate aluminum and aluminum alloys into a porous $B_4C$ sponge. The thermal modification process requires heating to high temperatures, about 2000° C., in a controlled atmosphere, thereby sintering the ceramic grains.

The process of the present invention is superior to the prior art for the following reasons:

1. It is more economical than previously described infiltration processes.
2. It results in a microstructure that offers improved properties over other processes.
3. It is possible to achieve tailorable properties in a fully dense composite body.
4. It is less costly than current commercial processes (hot pressing, hot-isostatic pressing, etc).

Accordingly, it is an object of the invention to provide an infiltration method for producing $B_4C$-reactive metal, and particularly $B_4C$-Al, composites.

It is another object to provide fully dense composites by an infiltration process.

It is also an object to provide a method of producing boron- and boride- reactive metal composites by infiltration.

SUMMARY OF THE INVENTION

The invention is a process for the infiltration of molten reactive metals into chemically pre-treated boron carbide, boron, or boride starting constituents (powders, fibers, etc.) that have been consolidated into a ceramic precursor or sponge via conventional or colloidal-chemical-casting techniques, or by injection molding processes. The process includes the steps of chemical pretreatment of the starting constituents, consolidation of the chemically pretreated starting constituents into a precursor, and infiltration of the reactive metal into the precursor. The infiltrated precursor can then be further heat treated to produce desired reaction products in a tailored microstructure.

This invention is superior to the prior art in that it is more economical than conventional processing methods, such as hot-isostatic pressing and hot pressing. The process also costs considerably less than the recently developed method of infiltration using thermally-modified precursors.

The invention not only offers cost savings but results in a product with increased toughness, strength, and thermal and electrical conductivity in these materials over the same processed by other methods.

The key to this process is controlling the surface chemistry of the starting constituents. when the mechanisms of infiltration are inhibited by undesirable phases (such as oxides and/or stoichiometric deficiencies) at the surface of these starting constituents, it is possible to chemically convert or chemically convert and then subsequently pyrolyze them at low temperatures into phases which are conducive to the process. By chemically controlling the surface of the starting constituents, full density, i.e., greater than 99% of theoretical density, can be achieved by infiltration.

Additional advantages of the new process include the ability to fabricate gradient microstructures with properties that can be tailored to meet use demands which vary along the finished part. The invention could also be incorporated with injection molding in a two-step process. Here, small highly-configured geometries can be molded using binders containing the appropriate chemical pre-treatment agents as the first step. Then the binder is volatilized from the precursor making it ready for subsequent infiltration in the second step.

This new process is particularly applicable to the fabrication of boron carbide-aluminum cermets. However, the process can also be used with boron and boride starting constituents, and other reactive metals, or alloys, or compounds which reduce to the metal or alloy during the process.

DETAILED DESCRIPTION OF THE PREFERRED EMBODIMENT

The infiltration process of the present invention is a chemical modification method. The process is more economical than thermal modification methods because chemical treatments can be done at room temperatures with relatively inexpensive chemicals, whereas thermal treatments require costly furnace equipment to obtain temperatures between 1800° C. and 2250° C. in controlled atmospheres (i.e., with minimal oxygen contamination, etc).

Figure 1A:
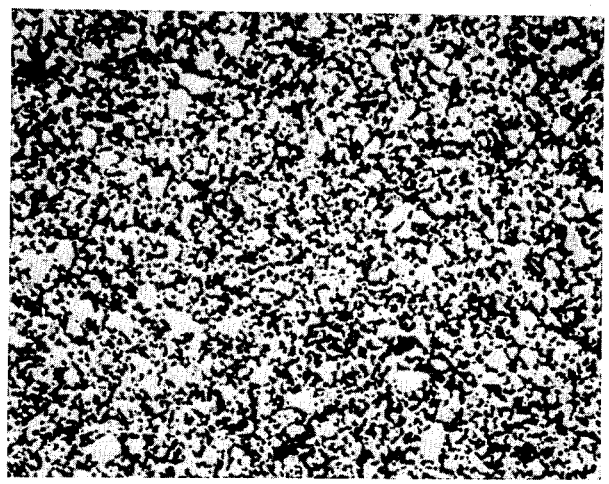
FIGS. 1A,B show two $B_4C$ precursor (sponge) morphologies produced by the thermal modification process.
Figure 1B:
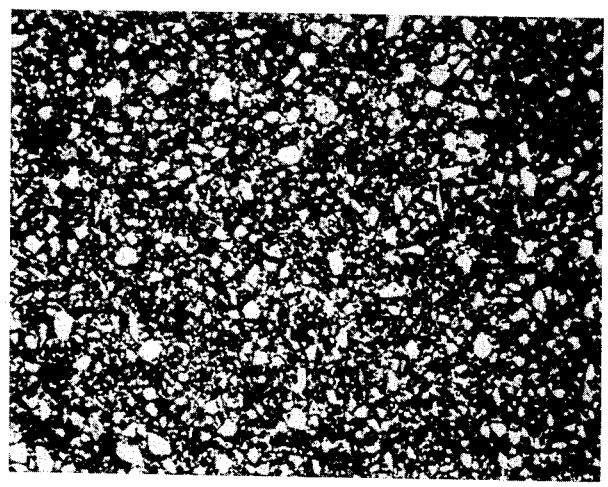
Figure 2A:
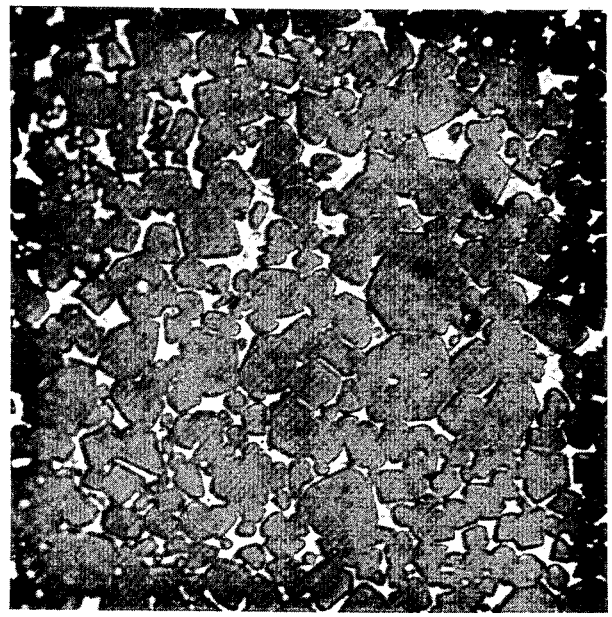
FIGS. 2A,B show two infiltrated microstructures of titanium carbide (TiC) cermet having continuous and discontinuous carbide networks, respectively.
Figure 2B:
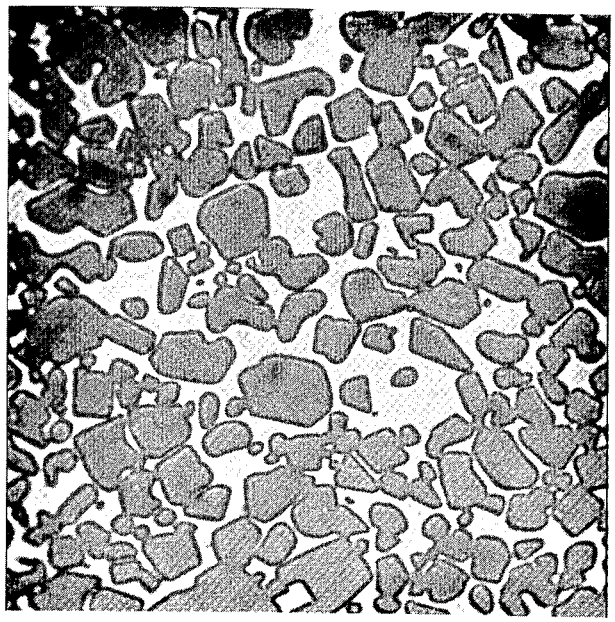

The chemical modification process of the invention results in microstructures that have improved properties over those produced by thermal modification processes. The microstructure characteristics of concern can be illustrated by examining FIGS. 1A,B and 2A,B; these Figures do not show composites made by the process of the invention but serve to illustrate important features. FIGS. 1A,B show two different $B_4C$ sponge morphologies, both obtained by thermal processes. The 27 vol % porosity sponge was achieved by heating previously cold-pressed $B_4C$ powders to 2100° C. for 30 min. in an argon atmosphere. The 39 vol % porosity sponge was fabricated in a similar manner but at 1900° C. for 30 min. The key difference in the sponge morphologies of FIGS. 1A,B is the degree of interconnecting of the $B_4C$ grains. The 2100° C. microstructure has been partially sintered to a greater extent than the 1900° C. microstructure. Both of these microstructures can be infiltrated with aluminum or aluminum alloys because thermal treatments result in a compositional modification of the $B_4C$ surface. This allows the kinetics of densification to proceed faster than the kinetics of interfacial chemical reactions resulting in dense final bodies. FIGS. 2A,B show two infiltrated microstructures of prior art TiC cermets. There is a greater degree of interconnected grains in FIG. 2A over that of FIG. 2B. The continuous and the discontinuous carbide networks result in microstructures that have widely differing properties. The process of the present invention includes control of the porosity and degree of interconnection. It is an object of the invention to produce a disconnected morphology, i.e., wherein the ceramic grains are not fused together and are preferably surrounded by metal. The thermal modification process produces a connected morphology as a result of the high temperature sintering. These property differences of composites prepared according to the invention compared to composites prepared by thermal processes are qualitatively outlined in Table I.

TABLE I
MECHANICAL AND PHYSICAL PROPERTY BEHAVIOR RELATIONSHIP OF CERMETS TO CARBIDE SPONGE MORPHOLOGY
Equal Weight Carbide Morphology

| Property | Connected (Thermal Process) | Disconnected (Chemical Process) |
|---|---|---|
| Hardness | increases | decreases |
| Toughness | decreases | increases |
| Brittleness | increases | decreases |
| Ductility | decreases | increases |
| Modulus of Rupture | decreases | increases |
| Elastic Modulus | increases | decreases |
| Impact Resistance | decreases | increases |
| Thermal Conductivity | decreases | increases |
| Electrical Conductivity | decreases | increases |
| Neutron Absorption | unchanged | unchanged |

Figure 3A:
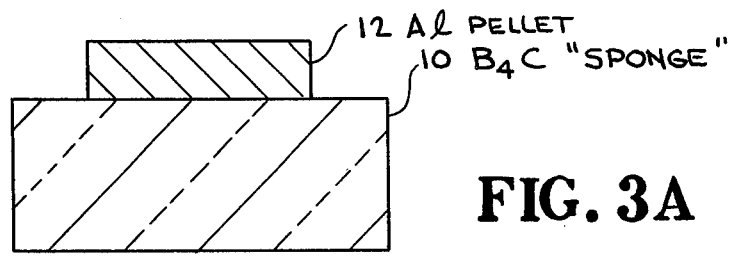
FIGS. 3A,B,C are schematic diagrams of the infiltration of a metal into a precursor.
Figure 3B:
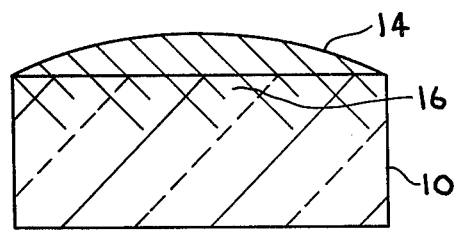
Figure 3C:
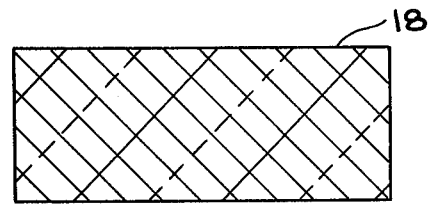

The infiltration step of the process is schematically shown in FIGS. 3A,B,C. The chemical modification process is performed on the $B_4C$ starting constituents prior to preparation of the porous $B_4C$ precursor or sponge 10. Once the chemically modified precursor 10 is prepared, aluminum metal 12 is placed on the precursor 10. The metal and precursor are heated to achieve the wetting condition so that molten metal 14 flows or infiltrates into the pore space 16 of the precursor. By filling the pore volume with metal, a fully dense composite 18 is produced.

One major advantage of the infiltration process of the invention is that it allows the fabrication of "graded" or gradient microstructures. The term "graded" means that the metal content in the cermet component varies along one or more directions so the physical and mechanical properties of any given section can accommodate the imposed conditions which could also vary in these directions.

The fabrication of graded components can be accomplished by controlled colloidal consolidation of the $B_4C$ precursor after chemical modifications have been made to the $B_4C$ starting constituents. Colloidal consolidation is a method whereby the $B_4C$ starting particulates are suspended temporarily in a liquid medium. Then by selecting an electrostatic, steric, or combined electrostatic and steric (electrosteric) means of controlling the sol, it is possible to control the forces between particulates (which may also be classified into controlled size distributions) to cause them to remain dispersed or allow them to flocculate. This control results in a desired sponge morphology upon consolidating the green body by gravitational settling filtration casting (pressure or pressureless), centrifugal casting, or injection molding technologies.

The colloidal consolidation approach combined with controlled polymodal size distributions of $B_4C$ starting constituents allows the fabrication of $B_4C$ precursors with controlled porosities from less than 10 vol % to over 80 vol %. These pores are subsequently infiltrated with liquid aluminum, aluminum alloys or compounds which are reduced to aluminum or aluminum alloys during the process, thereby offering a wide range of properties in the "as-infiltrated" cermet.

A colloidal consolidation method is described in U.S. patent application Ser. No. 730,528, filed May 6, 1985, now U.S. Pat. 4,605,440 which is here in incorporated by reference.

Other, more conventional, means can also be used to fabricate the $B_4C$ precursor after chemical modification of the starting constituents. These include cold pressing, warm pressing, (e.g., injection molding with a binder phase), plasma jet coating, combustion synthesis, hot pressing, hot-isostatic pressing etc. By selectively loading (either with different powder densities or with different pressures) the pressing dies, cavities, or molds it is also possible to obtain gradient $B_4C$ sponge morphologies, but with less control than with the colloidal consolidation method previously described. With either method, however, the gradient morphology will be maintained after infiltration.

Figure 4:
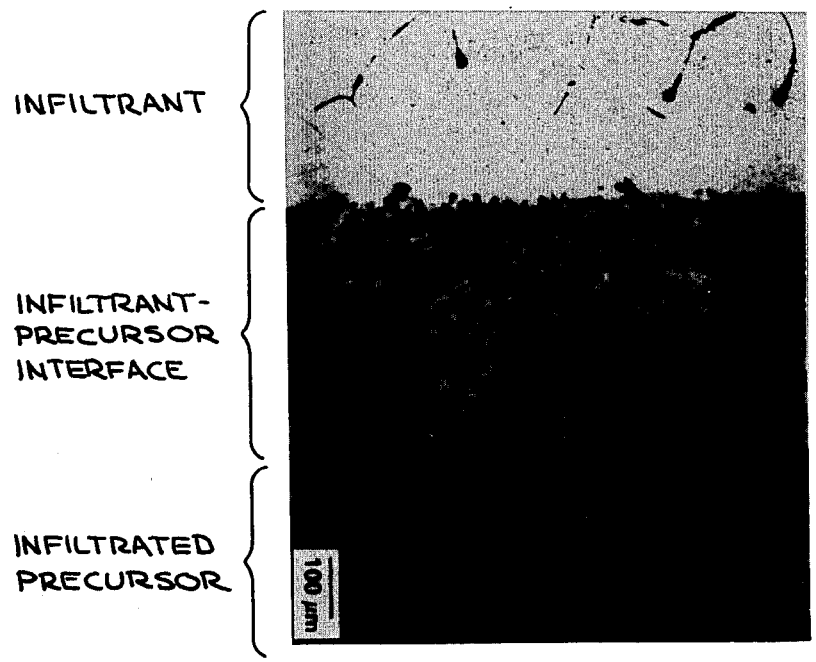
FIG. 4 shows the infiltrant-precursor interface in an Al-$B_4C$ composite.

The graded precursor can also be achieved on a shaped product, even when the starting sponge morphology is of uniform density, i.e., not graded. With a selected $B_4C$ starting size distribution, proper control of the infiltration process, and/or non-isothermal heat treatments, selected areas of the shaped product can be preferentially altered. Another important effect that can be achieved by the infiltration process is the integral attachment of a metallic aluminum or aluminum alloy surface to the $B_4C$ precursor. This metal-enriched surface film is merely an extension of the aluminum or aluminum alloy phase of the infiltrated structure and it may or may not be saturated with phases typical to $B_4C$-Al or $B_4C$-Al-alloy cermets depending on the processing conditions employed. This concept can be extended to the idea of attaching a bulk metal phase to the infiltrated structure thereby creating a gradient microstructure. This is especially observed along the edge of the precursor-infiltrant interface where a dispersion and separation of the carbide grains is preponderant. This phenomenon is illustrated in FIG. 4 for an Al infiltrant and $B_4C$ precursor. This type of product could have completely different properties at the surface or surfaces of the part compared to its bulk properties.

It is also possible to coinfiltrate the $B_4C$ precursor with different metals or other infiltratable materials to even further enhance the multiproperty character of the products obtained.

The chemical modification of $B_4C$ starting constituents involves immersing of the starting constituents in selected chemical solutions. The exposure of the $B_4C$ surfaces to these chemical solutions results in a chemical reaction at the $B_4C$-solution interface. The reaction products that form at the $B_4C$-solution interface have stoichiometrically different boron to carbon ratios than that of the initial $B_4C$ starting constituent. It is primarily this difference in B:C ratios at the surface that inhibits the reaction kinetics and/or promotes the densification kinetics during the infiltration process.

Boron carbide ($B_4C$) is typically prepared by a carbothermic reduction of boric anhydride ($B_2O_3$, also called boron oxide, boron trioxide, boric oxide, or boron sesquioxide) with carbon by the following chemical reaction:

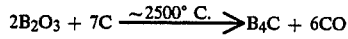
$$2B_2O_3 + 7C \xrightarrow{\sim 2500^\circ C.} B_4C + 6CO$$

Other, more sophisticated, manufacturing processes have been developed which also result in the production of boron carbide. Boron carbide as discussed herein is not limited to the stoichiometry of $B_4C$, but can exist as a homogeneous range of boron and carbon atoms with carbon contents between less than 1 atom % and 25 atom %. Other boron carbides outside of this homogeneity range have also been reported. Therefore, this invention is applicable to all types of boron carbide starting constituents, amorphous or crystalline, regardless of stoichiometries. This invention is also applicable to boron or other boride starting constituents.

The key to this invention is not the control of the bulk chemistry of the $B_4C$ starting constituents but rather the control of their surface chemistry. These starting constituents are typically in the form of powders from as large as several millimeters to as small as tens of angstroms in size. The smaller the size the larger the surface area per unit volume of $B_4C$, hence the greater effect surface properties play on processing behavior.

Any $B_4C$ starting constituent, either through incomplete reactions during manufacture or by the mere contact with an atmosphere that contains oxygen, will have a surface layer of $B_2O_3$ or other boron oxide stoichiometry at its surface as a contaminant. Other contaminants or impurities may also be present in the surface as well as in the bulk (e.g., Fe, Ti, Al, Si, Ca, Mg, Ni, Cr, Mn, Cu, Ag, Be, etc.). The level of these other impurities depends on the manufacturing process and is usually on the order of a few parts per million up to as much as a few tenths of a weight percent in the bulk and even less at the surface. The levels of these other contaminants at the surface are insignificant compared to the amount of boron oxides (herein referred to as just $B_2O_3$ for brevity).

In addition to the $B_2O_3$ at the surface of the $B_4C$ starting constituents, the presence of moisture in the atmosphere will cause some or all of the $B_2O_3$ surface to convert to boric acid ($BH_3O_3$, also called boracic acid or orthoboric acid). Sometimes the $B_2O_3$ can exist in a hydrated state ($B_2O_3 \cdot H_2O$).

When $B_2O_3$ and/or $BH_3O_3$ "contaminated" $B_4C$ starting constituents are used to prepare the $B_4C$ precursor prior to infiltration, the surface chemistry at the infiltrant-precursor interface will not be conducive to the infiltration process for two reasons: (1) a large concentration of $B_2O_3$ and/or $BH_3O_3$ at the surface will, upon heating past 450° C., form a liquid phase which fills the pores of the precursor and inhibits infiltration of the molten metal; or (2) a small concentration of $B_2O_3$ and/or $BH_3O_3$ at the surface will, upon heating past 450° C., form a liquid phase which acts as a flux causing an increase in the reaction rates of the chemical reactions at the $B_4C$-Al interface. This later condition will cause the reaction kinetics to be accelerated faster than the kinetics of densification (infiltration) thereby "locking up" the microstructure with residual porosity before full density is achieved. In either case the presence of an undesired B:C ratio at the surface of the precursor is established.

When the precursor undergoes the previously described thermal modification process two results occur: First, the $B_2O_3$ and/or $BH_3O_3$ is volatilized at temperatures near 2000° C. in an argon atmosphere. Second, the free boron present at the interface will form boron-nitrogen phases and/or a change in $B_4C$ stoichiometry. The nitrogen is made available via the argon gas which can typically contain up to or more than 100 ppm $N_2$. The formation of BN is thermodynamically favored over that of $B_4C$ at temperatures near 2000° C. (-12 kcal/mole versus -6 kcal/mole for BN and $B_4C$, respectively at 2000° C.). Because we are dealing with surface chemistry, these effects do not have to be large in extent and usually occur within the first 30–50Å of the surface. The removal of $B_2O_3$ and/or $BH_3O_3$ plus the presence of BN and/or $B_4C$ stoichiometry changes at the surface alters the B:C ratio such that the surface chemistry of the infiltrant-precursor interface is conducive to the infiltration process. That is, the kinetics of reaction are slowed down while the system is in a condition which is thermodynamically favorable for wetting to occur; or the kinetics of densification (infiltration) are faster than the kinetics of chemical reactions at the $B_4C$-Al interfaces.

In this invention, the B:C ratio is adjusted chemically rather than thermally. This is accomplished by immersing or washing the $B_4C$ starting constituents in a chemical substance which reacts with the $B_2O_3$ and/or $BH_3O_3$ to form trimethyl borate ($C_3H_9BO_3$, also called boric acid, trimethyl ester) and/or any other boron-carbon-hydrogen-oxygen chemical complex that will pyrolyze upon heating prior to or during the infiltration process to the required B:C ratio or ratios. The starting constituents are immersed for as long as necessary to change the surface chemistry, typically a few hours to a few days or longer. Some of the preferred chemical substances that react with $B_2O_3$ and/or $BH_3O_3$ to form $C_3H_9BO_3$ and/or any other boron-carbon-hydrogen-oxygen chemical complex include, but are not limited to the following:

1. Methanol ($CH_4O$ or $CH_3OH$, also called methyl alcohol, carbinol, wood spirit, or wood alcohol).
2. Anhydrous alcohol ($C_2H_6OH$ to which has been added some substance or substances which renders it entirely unfit for consumption as a beverage; e.g., methanol, camphor, aldehol, amylalcohol, gasoline, isopropanol terpineol, benzene, caster oil, acetone, nicotine, aniline dyes, ether, cadmium iodide, pyridine bases, sulfuric acid, kerosene, diethyl phtholate, etc.).
3. n-Propyl alcohol ($C_3H_8O$ or $CH_3CH_2CH_2OH$, also called 1-propanol or propylic alcohol).
4. Isopropyl alcohol ($C_3H_8O$ or $CH_3HOHCH_3$, also called 2-propanol, isopropanol, secondary propyl alcohol, dimethyl carbinol, or petrohol).
5. n-Butyl alcohol ($C_4H_{10}O$ or $CH_3CH_2CH_2CH_2OH$, also called 1-butanol, butyl alcohol, or propyl carbinol).
6. sec-Butyl alcohol ($C_4H_{10}O$ or $CH_3CH_2CH(OH)CH_3$, also called 2-butanol, butylene hydrate, 2-hydroxy butane, or methyl ethyl carbinol).
7. tert-Butyl alcohol $C_4H_{10}O$ or $(CH_3)_3COH$, also called 2-methyl-2-propanol, or trimethyl carbinol).
8. Any azeotrope of the above.
9. Any dilution of the the above.
10. Any higher alcohol $C_nH_mO$), where n $\geq 4$ and m $\geq 10$), or azeotrope or dilution thereof.
11. Glycerol $C_3H_8O_3$ or $CH_2OHCHOHCH_2OH$, also called 1, 2, 3-propanetriol, glycerin, or trihydroxypropane).
12. Any glycerol derivative $C_nH_mO_p$, where n $\geq 3$, m $\geq 6$, and p $\geq 2$), including glyceraldehyde $C_3H_6O_3$), glyceric acid ($C_3H_6O_4$ or $CH_2OHCH(OH)COOH$), glycerol formals ($C_4H_8O_3$), and glycidol $C_3H_6O_2$).
13. Any methyl- abietate ($C_{21}H_{32}O_2$), acetate ($C_3H_6O_2$ or $CH_3COOCH_3$), acetoacetate ($C_3H_8O_3$ or $CH_3COCH_2COOCH_3$), acetylsalicylate ($C_{10}H_{10}O_4$), acrylate ($C_4H_6O_2$ or $CH_2=CHCOOCH_3$, benzoate ($C_8H_8O_2$ or $C_6H_5COOCH_3$), benzoylsalicylate ($C_{15}H_{12}O_4$), butyl ketone ($C_6H_{12}O$ or $CH_3COC_4H_9$), butyrate ($C_5H_{10}O_2$ or $CH_3(CH_2)_2COOCH_3$), carbitol ($C_5H_{12}O_3$ or $CH_3OCH_2CH_2OCH_2CH_2OH$), carbonate ($C_3H_6O_3$ or $CO(OCH_3)_2$), cellosolve ($C_3H_8O_2$ or $HOCH_2CH_2OCH_3$), cellosolve acetate ($C_5H_{10}O_3$ or $CH_3OCH_2CH_2OOCCH_3$), or methylcellulose, or methylal ($C_3H_8O_2$ or $CH_2(OCH_3)_2$).
14. Boiling water.
15. Cold water.
16. Any combination of the above, in part or whole.
17. Any binder, for the purpose of injection molding, containing any of the above, in part or whole.

The infiltration process according to the invention can be summarized as follows:

Step 1

Precursor starting constituents, typically in powder form, are immersed in a chemical substance as previously described. The surface chemistry is altered to facilitate wetting.

Step 2

The chemically treated starting constituents are then consolidated or packed into a porous "sponge" or compact by colloidal chemical means followed by a selected casting method as previously explained to form the consolidated precursor. Alternatively, other consolidation methods can be used.

Step 3

The metal phase is placed adjacent to the consolidated precursor and the assembly is placed in a vacuum or inert atmosphere furnace.

Step 4

The assembly is heated to conditions which promote wetting.

Step 5

The assembly can also be further heated to conditions which promote microstructural enhancement and/or gradiation as previously described.

Step 6

The final part is removed from the furnace and machined to its final dimensions (if not already processed to its desired configuration).

The infiltration process of the invention is carried out in accordance with the wetting and reaction conditions described in U. S. patent application Ser. No. 730,538, filed May 6, 1985, now U.S. Pat. No. 4,605,440 which is herein incorporated by reference. By controlling the reaction conditions, e.g., temperature and time, the relative proportion of various phases in the composite microstructure is controlled.

EXAMPLE 1

Start with 1 micron average diameter $B_4C$ powders. Soak these starting constituents in methanol for 10 days with continuous stirring. Filter cast this slurry into a mold of desired configuration. Remove casted precursor (sponge) from mold and place an amount of aluminum equivalent to the calculated pore volume of the precursor on the sponge. Heat in a vacuum furnace to 500° C. and hold for one hour (to remove volatiles), then increase temperature to 1180° C. for a long enough time to allow for complete infiltration of aluminum into the precursor, then cool under vacuum. Remove fired part. Final machine if necessary.

EXAMPLE 2

Start with a polymodal distribution of 0.2 micron and 0.8 micron diameter $B_4C$ powders. Soak these starting constituents in methanol with a 3 wt. % polyethylene glycol binder addition for 10 days with continuous stirring. Filter cast this slurry through a filtration-funnel system and catch all starting constituents on filter paper. Scrape these starting constituents into a cold pressing die and press to 10,000 psi. Remove precursor from die and place in a crucible containing a bed of powdered aluminum equivalent to or greater than the calculated pore volume of the precursor. Heat assembly in a vacuum furnace to 500° C. and hold for one hour, then increase temperature to 1050° C. for a long enough time to allow for complete infiltration of aluminum into the sponge, then drop temperature to 800° C. for 24 hours to enhance the microstructure, then cool under vacuum. Remove assembly and machine to final dimensions.

EXAMPLE 3

Start with 10 micron average diameter $B_4C$. Soak these starting constituents in isopropanol for 10 days with continuous stirring. Filter cast this slurry through a filtration-funnel system and catch all starting constituents on filter paper. Scrape off these starting constituents and mix them with a thermoplastic injection molding resin containing methylcellulose (binder). Injection mold the mix into a desired mold configuration. Remove the consolidated $B_4C$-resin mix and place in a vacuum oven and "burn out" the binder leaving only the $B_4C$ sponge. Place an amount of aluminum alloy (e.g., 7075-T6) equivalent to the calculated pore volume of the precursor on top of the sponge. Heat the assembly in a vacuum furnace to 1100° C. for 2 hours (to cause both infiltration and microstructural enhancement). Remove fired part and finish machine if necessary.

The invention has been described with respect to the treatment of $B_4C$ starting constituents for the formation of $B_4C$-Al composites. However, boron and boride, e.g., $AlB_{12}$, $AlB_2$, $TiB_2$, starting constituents can similarly be treated prior to the formation of the porous precursor. Reactive metals, or alloys thereof, or compounds which reduce to the metal or alloy, can then be infiltrated by heating to the wetting condition, and the infiltrated precursor can be further heat treated to promote reactions to tailor the microstructure of the composite.

Changes and modifications in the specifically described embodiments can be carried out without departing from the scope of the invention which is intended to be limited only by the scope of the appended claims.

We claim:

1. A method of fabricating metal-ceramic composites from previously formed ceramic precursor starting constituents selected from boron-carbide, boron and borides and metals reactive therewith selected from reactive metals, alloys thereof, and compounds thereof which reduce to reactive metals or alloys thereof, comprising:
 chemically pretreating the previously formed starting constituents of a ceramic precursor;
 consolidating the chemically pretreated starting constituents into a porous ceramic precursor;
 infiltrating molten reactive metal into the chemically pretreated ceramic precursor;
 wherein the step of chemically pretreating the starting constituents of the ceramic precursor alters the surface chemistry to enhance infiltration of the precursor by the molten reactive metal by slowing the kinetics of reaction relative to the kinetics of densification.

2. The method of claim 1 wherein the step of chemically pretreating the starting constituents comprises chemically altering the surface chemistry of the starting constituents to eliminate phases which inhibit infiltration.

3. The method of claim 2 wherein the step of chemically pretreating the starting constituents comprises chemically converting phases which inhibit infiltration to phases which promote infiltration.

4. The method of claim 3 further including pyrolyzing the chemically converted phases at low temperature.

5. The method of claim 1 further comprising forming the starting constituents into particles prior to chemically pretreating.

6. The method of claim 5 further comprising forming the particles with a controlled polymodal size distribution.

7. The method of claim 1 wherein the step of consolidating the starting constituents is performed by colloidal consolidation.

8. The method of claim 6 wherein the step of consolidating the starting constituents is performed by colloidal consolidation.

9. The method of claim 1 wherein the steps of pretreating and consolidating the starting constitutents are performed by injection molding the starting constituents using a binder containing chemical pretreatment agents.

10. The method of claim 1 wherein the step of pretreatment is performed by immersing the starting constituents in a chemical solution to produce chemical reactions at the surface of the starting constituents.

11. The method of claim 10 for boron-carbide starting constituents comprising changing the boron to carbon ratio at the surface of the starting constituents.

12. The method of claim 1 comprising chemically removing $B_2O_3$, $BH_3O_3$ and $B_2O_3 \cdot H_2O$ from the surface of the starting constituents.

13. The method of claim 10 comprising immersing the starting constituents in any of the following:
 a. methanol ($CH_4O$ or $CH_3OH$);
 b. anhydrous alcohol ($C_2H_6OH$);
 c. n-propyl alcohol ($C_3H_8O$ or $CH_3CH_2CH_2OH$);
 d. isopropyl alcohol ($C_3H_8O$ or $CH_3HOHCH_3$);
 e. n-butyl alcohol ($C_4H_{10}O$ or $CH_3CH_2CH_2CH_2OH$);
 f. sec-butyl alcohol ($C_4H_{10}O$ or $CH_3CH_2CH(OH)CH_3$);
 g. tert-butyl alcohol $C_4H_{10}O$ or $(CH_3)_3COH$);
 h. any azeotrope of the above;
 i. any dilution of the the above;
 j. any higher alcohol ($C_nH_mO$), where $n \geq 4$ and $m \geq 10$), or azeotrope or dilution thereof;
 k. glycerol ($C_3H_8O_3$ or $CH_2OOHCHOHCH_2OH$);
 l. any glycerol derivative ($C_nH_mO_p$, where $n \geq 3, m \geq 6,$ and $p \geq 2$), including glyceraldehyde ($C_3H_6O_3$), glyceric acid ($C_3H_6O_4$ or $CH_2OHCH(OH)COOH$), glycerol formal ($C_4H_8O_3$), and glycidol ($C_3H_6O_2$);
 m. any methyl—abietate ($C_{21}H_{32}O_2$), acetate ($C_3H_6O_2$ or $CH_3COOCH_3$), acetoacetate ($C_3H_8O_3$ or $CH_3COCH_2COOCH_3$), acetylsalicylate ($C_{10}H_{10}O_4$), acrylate ($C_4H_6O_2$ or $CH_2=CHCOOCH_3$), benzoate ($C_8H_8O_2$ or $C_6H_5COOCH_3$), benzoylsalicylate ($C_{15}H_{12}O_4$), butyl ketone ($C_6H_{12}O$ or $CH_3COC_4H_9$), butyrate ($C_5H_{10}O_2$ or $CH_3(CH_2)_2COOCH_3$), carbitol ($C_5H_{12}O_3$ or $CH_3OCH_2CH_2OCH_2CH_2OH$), carbonate ($C_3H_6O_3$ or $CO(OCH_3)_2$), cellosolve ($C_3H_8O_2$ or $HOCH_2CH_2OCH_3$), cellosolve acetate ($C_5H_{10}O_3$ or $CH_3OCH_2CH_2OOCCH_3$), or methylcellulose, or methylal ($C_3H_8O_2$ or $CH_2(OCH_3)_2$);
n. boiling water;
o. cold water;
p. any combination of the above, in part or whole;
q. any binder, for the purpose of injection molding, containing any of the above, in part or whole.

14. The method of claim 1 wherein the step of infiltrating the metal into the precursor comprises:
placing the metal adjacent to the precursor;
heating the metal and precursor to a temperature which promotes wetting of the precursor by the metal.

15. The method of claim 14 wherein the heating step is performed in a vacuum.

16. The method of claim 14 wherein the heating step is performed in an inert atmosphere.

17. The method of claim 14 further comprising further heating to a temperature which promotes microstructural enhancement of the composite.

18. The method of claim 1 further comprising forming a graded microstructure.

19. The method of claim 7 further comprising forming a graded microstructure.

20. The method of claim 1 further comprising consolidating the starting constituents into a precursor having a substantially disconnected microstructure.

21. A composite formed by the method of claim 1.
22. A composite formed by the method of claim 13.
23. A composite formed by the method of claim 18.
24. A composite formed by the method of claim 20.

* * * * *